United States Patent
Cheng et al.

(10) Patent No.: US 12,093,140 B2
(45) Date of Patent: Sep. 17, 2024

(54) DATA RECOVERY METHOD, APPARATUS, AND SOLID STATE DRIVE

(71) Applicant: Shenzhen Dapu Microelectronics Co., Ltd., Shenzhen (CN)

(72) Inventors: Bo Cheng, Shenzhen (CN); Shaoquan Liu, Shenzhen (CN); Bin Han, Shenzhen (CN); Yafei Yang, Shenzhen (CN)

(73) Assignee: SHENZHEN DAPU MICROELECTRONICS CO., LTD., Shenzhen (CN)

(*) Notice: Subject to any disclaimer, the term of this patent is extended or adjusted under 35 U.S.C. 154(b) by 112 days.

(21) Appl. No.: 17/951,599

(22) Filed: Sep. 23, 2022

(65) Prior Publication Data
US 2023/0016555 A1 Jan. 19, 2023

Related U.S. Application Data

(63) Continuation of application No. PCT/CN2021/089374, filed on Apr. 23, 2021.

(30) Foreign Application Priority Data

Jun. 18, 2020 (CN) .......................... 202010561718.3

(51) Int. Cl.
    *G06F 11/00* (2006.01)
    *G06F 3/06* (2006.01)
    *G06F 11/14* (2006.01)

(52) U.S. Cl.
    CPC ........ *G06F 11/1469* (2013.01); *G06F 3/0619* (2013.01); *G06F 3/065* (2013.01);
    (Continued)

(58) Field of Classification Search
    CPC ............ G06F 11/1441; G06F 11/1469; G06F 3/0619; G06F 3/065; G06F 3/0656
    See application file for complete search history.

(56) References Cited

U.S. PATENT DOCUMENTS

5,530,673 A * 6/1996 Tobita ................. G06F 12/0866
                                                           365/185.11
10,019,362 B1 7/2018 Chatterjee et al.
(Continued)

FOREIGN PATENT DOCUMENTS

CN 103377152 A 10/2013
CN 103744795 A 4/2014
(Continued)

OTHER PUBLICATIONS

International Search Report and Written Opinion in related PCT Application No. PCT/CN2021/089374 dated Jul. 29, 2021 (9 pages).

*Primary Examiner* — Joshua P Lottich
(74) *Attorney, Agent, or Firm* — Bayes PLLC

(57) ABSTRACT

A data recovery method, an apparatus, and a solid state drive are provided. The method includes: copying, after an abnormality occurs in the solid state drive, memory data of a first memory space to a solidified area of a second memory space, and then writing address information of the solidified area to a third memory space; recovering, after a controller is reset for the first time, the memory data of the first memory space according to the address information of the solidified area; flushing data of the second memory space into a flash memory space according to the recovered memory data of the first memory space; and performing, after the controller is reset for the second time, data recovery on the solid state drive according to memory data of the flash memory space.

20 Claims, 7 Drawing Sheets

(52) U.S. Cl.
CPC .......... *G06F 3/0656* (2013.01); *G06F 3/0679* (2013.01); *G06F 11/1441* (2013.01)

(56) References Cited

U.S. PATENT DOCUMENTS

| | | | |
|---|---|---|---|
| 2011/0099325 A1* | 4/2011 | Roh | G06F 3/0679 |
| | | | 711/E12.008 |
| 2014/0310483 A1* | 10/2014 | Bennett | G06F 3/064 |
| | | | 711/154 |
| 2016/0283336 A1 | 9/2016 | Petersen | |
| 2017/0344474 A1* | 11/2017 | Zhou | G06F 12/06 |
| 2022/0334990 A1* | 10/2022 | Karr | G06F 3/0629 |

FOREIGN PATENT DOCUMENTS

| | | | |
|---|---|---|---|
| CN | 104077197 A | 10/2014 | |
| CN | 111198655 A | 5/2020 | |
| CN | 111752487 A | 10/2020 | |

* cited by examiner

DATA RECOVERY METHOD, APPARATUS, AND SOLID STATE DRIVE

CROSS-REFERENCE TO RELATED APPLICATIONS

This application is a continuation of International Application No. PCT/CN2021/089374, filed on Apr. 23, 2021, which claims priority to Chinese Patent Application No. 202010561718.3, filed on Jun. 18, 2020. The entire contents of each of the above-referenced applications are expressly incorporated herein by reference.

TECHNICAL FIELD

Embodiments of the present application relate to the field of solid state drive applications, and in particular, to a data recovery method, apparatus, and solid state drive.

BACKGROUND

Solid State Drives (SSDs) are hard disks made of solid state electronic memory chip arrays. A solid state drive includes a control unit and a memory unit (a FLASH memory chip or a DRAM memory chip). At present, a considerable part of solid state drive systems have a Dynamic Random Access Memory (DRAM), so the SSD has a large data cache space to cache data.

An enterprise SSD system usually has a large-capacity Dynamic Random Access Memory (DRAM), and the DRAM is generally configured at $\frac{1}{1000}$ of the SSD capacity. For example, an SSD with a 1 TB capacity is equipped with a 1 GB Double Data Rate Synchronous Dynamic Random Access Memory (DDR SRAM). Most of the space in the DRAM is used for storing a mapping table, and some is used as a cache for user data, logs that are currently being written, and configuration information at runtime. In addition to user data, other data existing in the DRAM is collectively referred to as metadata. In the case of normal power-off, a host will notify the disk to go through the normal power-off process. After receiving the command, the SSD will input the cached user data and metadata stored in the DRAM to a NAND, and recover the latest mapping table information and metadata information through a certain process after power-on. In the case of a sudden power failure, a capacitor is used to provide a short-term power supply to allow the user data cached in the DRAM and some metadata stored in the DRAM to be flushed down to the NAND, thus ensuring that the user data is not lost.

However, when the solid state drive encounters an abnormality, such as a defect in the firmware or the hardware logic of the SSD, one or a plurality of components/software modules in the SSD cannot work normally. At this time, it cannot be guaranteed that the data existing in the DRAM of the SSD can be flushed to the NAND. After the SSD is reset or hot-swapped, the data in the DRAM will be lost. Due to the loss of important metadata, the SSD cannot work normally after power-on again, and all user data will be lost.

At present, for the abnormality caused by a defect of the SSD firmware, the data recovery method in the prior art includes recovery through backup, but this method requires an upper-layer application that has made a backup, and the recovery time is very long, which has a great impact on the business. Alternatively, after the data is abnormal, the data is written into another non-volatile medium and recovered when powered on. However, during recovery in this way, the SSD firmware needs to scan all blocks in the SSD to rebuild a mapping table, resulting in a very long recovery time, usually counted in hours.

Based on this, the existing technology is in urgent need of improvement.

SUMMARY

The embodiments of the present application aim to provide a data recovery method, apparatus, and solid state drive, which solve the technical problem of the long data recovery time of a solid state drive in current abnormal scenarios and improve the data recovery speed of the solid state drive.

In order to solve the above technical problems, the embodiments of the present application provide the following technical solutions:

In a first aspect, an embodiment of the present application provides a data recovery method, which is applied to a solid state drive. The solid state drive includes a first memory space, a second memory space, a third memory space, and a flash memory space, and the method includes:

copying, after an abnormality occurs in the solid state drive, memory data of the first memory space to a solidified area of the second memory space, and then writing address information of the solidified area into the third memory space;

acquiring, after a controller is reset for the first time, the address information of the solidified area from the third memory space, and recovering the memory data of the first memory space according to the address information;

flushing data of the second memory space into the flash memory space according to the recovered memory data of the first memory space; and performing, after the controller is reset for the second time, data recovery on the solid state drive according to memory data of the flash memory space.

In some embodiments, the solid state drive further includes: a register space, data in the register space will not be cleared after the controller is reset, and after the writing address information of the solidified area into the third memory space, the method further includes:

generating abnormal reset flag information, and writing the abnormal reset flag information into the register space.

In some embodiments, the flushing data of the second memory space into the flash memory space according to the recovered memory data of the first memory space includes:

acquiring a pointer to the data of the second memory space according to the recovered memory data of the first memory space; and flushing the data of the second memory space into the flash memory space according to the pointer to the data of the second memory space.

In some embodiments, the acquiring a pointer to the data of the second memory space according to the recovered memory data of the first memory space includes:

acquiring a pointer to user data of the second memory space and a pointer to metadata of the second memory space.

In some embodiments, the flushing the data of the second memory space into the flash memory space according to the pointer to the data of the second memory space includes:

flushing the metadata into a second preset area of the flash memory space after the user data is flushed into a first preset area of the flash memory space, wherein the second preset area is set for storing metadata.

In some embodiments, the method further includes:
determining pairing mapping information between logical addresses of the user data and physical addresses written into the first preset area; and
writing the pairing mapping information between logical addresses of the user data and physical addresses written into the first preset area into the second preset area.

In some embodiments, the performing, after the controller is reset for the second time, data recovery on the solid state drive according to memory data of the flash memory space includes:
acquiring user data from the flash memory space according to the pairing mapping information; and
recovering the acquired user data to a user area in the flash memory space, and updating a mapping table based on the pairing mapping information.

In some embodiments, after the data recovery is performed on the solid state drive, the method further includes: performing metadata verification to determine data consistency.

In a second aspect, an embodiment of the present application provides a data recovery apparatus, which is applied to a solid state drive. The solid state drive includes a first memory space, a second memory space, a third memory space, and a flash memory space, and the apparatus includes: an abnormality writing unit configured to copy, after an abnormality occurs in the solid state drive, memory data of the first memory space to a solidified area of the second memory space, and then write address information of the solidified area into the third memory space;
a data copying unit configured to acquire, after a controller is reset for the first time, the address information of the solidified area from the third memory space, and recover the memory data of the first memory space according to the address information;
a data flushing unit configured to flush data of the second memory space into the flash memory space according to the recovered memory data of the first memory space; and
a data recovery unit configured to perform, after the controller is reset for the second time, data recovery on the solid state drive according to memory data of the flash memory space.

In some embodiments, the solid state drive further includes: a register space, data in the register space will not be cleared after the controller is reset, and after the writing address information of the solidified area into the third memory space, the apparatus further includes:
a register reset flag unit configured to generate abnormal reset flag information, and write the abnormal reset flag information into the register space.

In some embodiments, the data flushing unit includes:
a pointer module configured to acquire a pointer to the data of the second memory space according to the recovered memory data of the first memory space; and
a flushing module configured to flush the data of the second memory space into the flash memory space according to the pointer to the data of the second memory space.

In some embodiments, the pointer module is configured to:
acquire a pointer to user data of the second memory space and a pointer to metadata of the second memory space.

In some embodiments, the flushing module is configured to:
flush the metadata into a second preset area of the flash memory space after the user data is flushed into a first preset area of the flash memory space, wherein the second preset area is set for storing metadata.

In some embodiments, the flushing module is further configured to:
determine pairing mapping information between logical addresses of the user data and physical addresses written into the first preset area; and
write the pairing mapping information between logical addresses of the user data and physical addresses written into the first preset area into the second preset area.

In some embodiments, the data recovery unit is configured to:
acquire user data from the flash memory space according to the pairing mapping information; and
recover the acquired user data to a user area in the flash memory space, and update a mapping table based on the pairing mapping information.

In some embodiments, the apparatus further includes:
a data consistency unit configured to perform metadata verification to determine data consistency.

In a third aspect, an embodiment of the present application provides a solid state drive, and the solid state drive includes:
a flash memory medium; and
a main controller connected to the flash memory medium, the main controller including:
at least one processor; and
a memory communicatively connected to the at least one processor; wherein
the memory stores instructions executable by the at least one processor, the instructions being executed by the at least one processor to enable the at least one processor to perform the data recovery method described above.

In a fourth aspect, an embodiment of the present application further provides a non-volatile computer-readable storage medium, the computer-readable storage medium stores computer-executable instructions, and the computer-executable instructions are used to enable a solid state drive to perform the data recovery method described above.

Beneficial effects of the embodiments of the present application are as follows: different from the prior art, a data recovery method provided by the embodiments of the present application is applied to a solid state drive, the solid state drive includes a first memory space, a second memory space, a third memory space, and a flash memory space, and the method includes: copying, after an abnormality occurs in the solid state drive, memory data of the first memory space to a solidified area of the second memory space, and then writing address information of the solidified area into the third memory space; acquiring, after a controller is reset for the first time, the address information of the solidified area from the third memory space, and recovering the memory data of the first memory space according to the address information; flushing data of the second memory space into the flash memory space according to the recovered memory data of the first memory space; and performing, after the controller is reset for the second time, data recovery on the solid state drive according to memory data of the flash memory space. By writing the data of the first memory space into the solidified area, recovering the data of the first memory space according to the address information of the solid state area, then writing it into the flash memory space, and finally performing data recovery from the flash memory space, the present application can improve the data recovery speed of the solid state drive.

BRIEF DESCRIPTION OF DRAWINGS

One or more embodiments are illustrated in accompanying drawings, and these illustrations do not constitute limitations to the embodiments. Elements with identical reference numerals in the accompanying drawings are denoted as similar elements, and unless otherwise stated, the figures in the accompanying drawings do not constitute a scale limitation.

DETAILED DESCRIPTION

Figure 1:
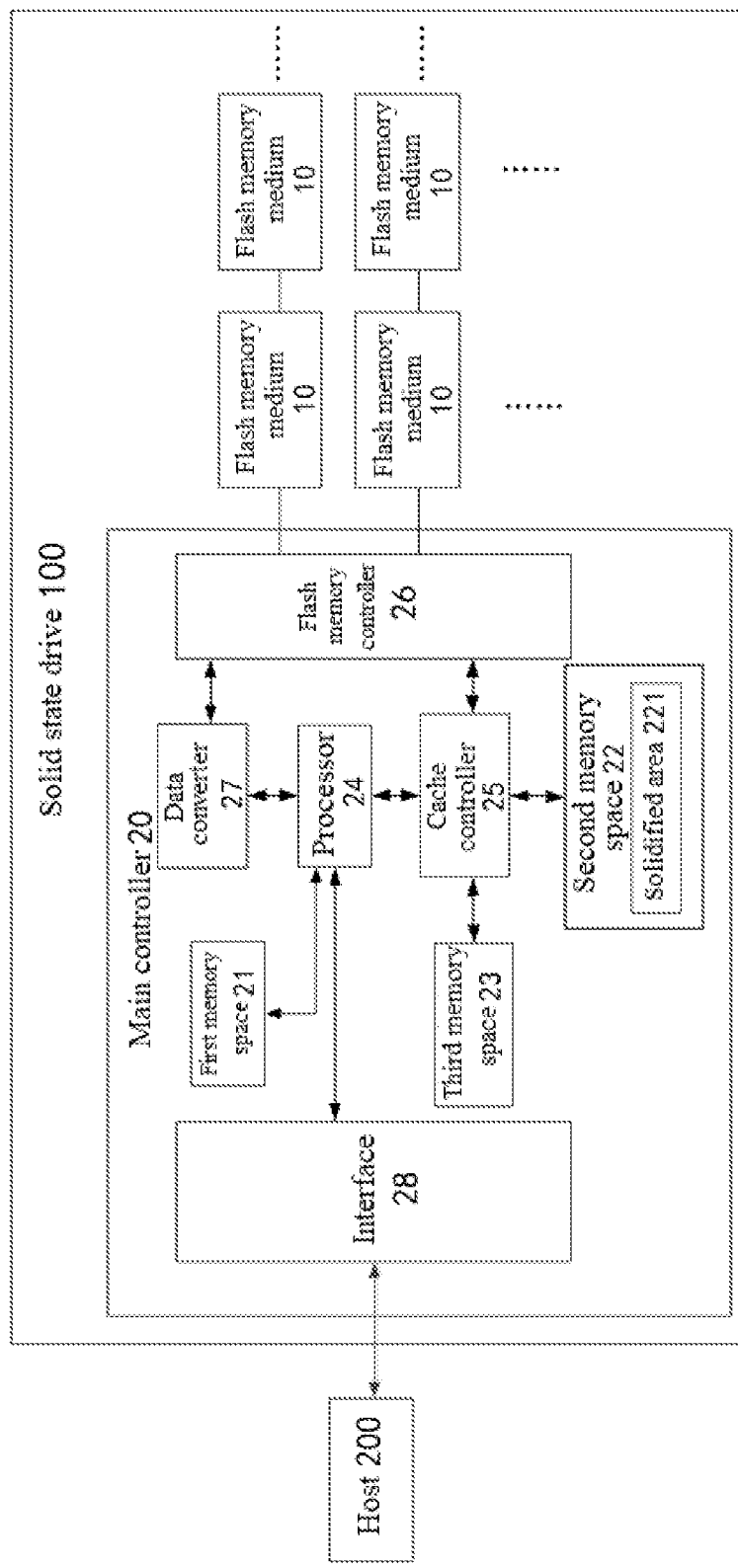
FIG. 1 is a schematic structural diagram of a solid state drive according to an embodiment of the present application.

In order to make the objectives, technical solutions, and advantages of the embodiments of the present application clearer, the technical solutions in the embodiments of the present application will be described below with reference to the accompanying drawings in the embodiments of the present application. The described embodiments are a part of the embodiments of the present application, but not all of the embodiments. Based on the embodiments in the present application, all other embodiments obtained by those of common skill in the art without creative efforts shall fall within the protection scope of the present application.

In addition, the technical features involved in various embodiments of the present application described below can be combined with each other as long as they do not conflict with each other.

An enterprise SSD system usually has a large Dynamic Random Access Memory (DRAM) for storing a mapping table, as well as caching user data and other metadata. During normal power failure and sudden power failure, there are related procedures to flush the user data, mapping table, and other metadata cached in the DRAM into a NAND, and then recover them from the NAND after power-on.

There is complex hardware and software logic in the SSD. Although it has been fully tested, it is still inevitable to encounter low-probability hardware/software defects. When the hardware/firmware of the SSD encounters a defect, data in the DRAM cannot be flushed down. After the power-off and power-on, the data cannot be recovered, resulting in the loss of user data.

At present, the method of reconstructing data in a disk when encountering an abnormality is generally reconstructing a mapping table by scanning the data in the disk and logical address information stored together with the data. As the capacity of the SSD becomes increasingly large, the time required for reconstructing a mapping table by this method is increasingly longer, usually counted in hours.

There are several starting methods for solid state drives. One is cold start. This starting method refers to power-on from a state of no power at all. In this state, data in a DRAM inside an SSD is random and useless data. Another is called hot start, which refers to that when a disk is powered on, a controller is reset and goes through an initialization process again. During the hot start, the data of the DRAM is guaranteed to be the same as that before the start.

Taking advantage of the characteristic that the data in the DRAM is not lost when the SSD is hot-started, when the SSD encounters an abnormality, a hot start is performed to reset the controller and recover the controller to a normal state. After the SSD data is recovered to normal, a power-off process is performed to store the data in the SSD to the NAND. Then, another hot start is performed to reset the controller. A normal power-on process is performed inside the SSD to recover the mapping table stored in the NAND.

In order to recover user data after the controller is reset, the SSD usually must flush some user data and metadata stored in a Static Random Access Memory (SRAM) or a Tightly Coupled Memory (TCM) and a Double Data Rate Synchronous Dynamic Random Access Memory (DDR SRAM) into the NAND for storage. After the reset, the data in the NAND is loaded to the SRAM, the TCM, or the DDR, and the metadata (mainly the mapping table) and the user data are recovered according to a certain recovery process. The recovery process after reset of the controller of the present application is also based on this idea, which deals with how to recover in a scenario where an abnormality is encountered in the SSD controller.

The technical solutions of the present application are described below with reference to the accompanying drawings of the description.

Referring to FIG. 1, a schematic structural diagram of a solid state drive according to an embodiment of the present application is shown.

As shown in FIG. 1, solid state drive 100 includes flash memory medium 10 and main controller 20 connected to flash memory medium 10. Solid state drive 100 is communicatively connected to host 200 in a wired or wireless manner, so as to realize data interaction.

Flash memory medium 10, as a storage medium of solid state drive 100, is also referred to as a flash memory, a FLASH, a FLASH memory, or a FLASH particle, which belongs to a kind of storage device, and is a kind of non-volatile memory, which can also store data for a long time without current supply, and has a storage characteristic equivalent to those of hard disks, so that flash memory medium 10 can become the basis of the storage media of various portable digital devices.

Flash memory medium 10 may be a NAND FLASH. The NAND FLASH uses a single transistor as a memory unit for binary signals, and its structure is very similar to that of a common semiconductor transistor. The difference is that the single transistor of the NAND FLASH has a floating gate and a control gate added therein. The floating gate is configured to store electrons, a surface thereof is covered by a layer of silicon oxide insulator, and the floating gate is coupled to the control gate through a capacitor. When negative electrons are injected into the floating gate under the action of the control gate, a storage state of the single crystal of the NAND FLASH is changed from "1" to "0," when the negative electrons are removed from the floating gate, the storage state is changed from "0" to "1," and the insulator covering the surface of the floating gate is used for trapping the negative electrons in the floating gate to realize data storage. That is, the memory unit of the NAND FLASH is a floating gate transistor, and the floating gate transistor is used to store data in the form of charges. The amount of stored charge is related to the magnitude of a voltage applied to the floating gate transistor.

One NAND FLASH includes at least one chip, each chip is composed of several physical blocks, and each physical block includes several pages. The physical block is the smallest unit of the NAND FLASH to perform an erase operation, the page is the smallest unit of the NAND FLASH to perform read and write operations, and the capacity of a NAND FLASH is equal to the quantity of its physical blocks * the quantity of pages contained in a physical block * the capacity of a page. In some embodiments, flash memory medium 10 may be classified into SLC, MLC, TLC, and QLC according to different levels of voltages of memory units.

Main controller 20 includes first memory space 21, second memory space 22, third memory space 23, processor 24, cache controller 25, flash memory controller 26, data converter 27, and interface 28.

First memory space 21 is connected to processor 24, where first memory space 21 is an address space close to the processor, the processor accesses first memory space 21 at a high speed, and first memory space 21 is configured to store data that needs to be accessed quickly, such as a pointer to a DDR space. In some embodiments, first memory space 21 is a Static Random Access Memory (SRAM) or a Tightly Coupled Memory (TCM).

In the embodiment of the present application, the first memory space includes at least one memory communicatively connected to a processor, the memory stores commands executable by at least one processor, and the instructions are executed by the at least one processor, so that the at least one processor can perform the data recovery method in the embodiment of the present application.

Second memory space 22 is connected to cache controller 25. In some embodiments, second memory space 21 is a DDR space, that is, a Double Data Rate Synchronous Dynamic Random Access Memory (DDR SRAM). Second memory space 22 includes solidified area 221, and solidified area 221 is used for storing data copied from first memory space 21.

Third memory space 23 is mainly configured to cache read/write instructions sent by host 200 and read data or write data acquired from flash memory medium 10 according to the read/write instructions sent by host 200. Third memory space 23, as a non-volatile computer-readable storage medium, may be configured to store non-volatile software programs, non-volatile computer-executable programs, and modules. Third memory space 23 may include a storage program area, and the storage program area may store an operating system and an application required by at least one function. In addition, third memory space 23 may include a high-speed random access memory, and may also include a non-volatile memory, such as at least one magnetic disk storage device, a flash memory device, or another non-volatile solid state storage device. In some embodiments, third memory space 23 may include a memory arranged remotely from processor 24. An example of the above network includes, but is not limited to, the Internet, an intranet, a local area network, a mobile communication network, and a combination thereof.

Processor 24 is connected to first memory space 21, cache controller 25, flash memory controller 26, data converter 27, and interface 28, respectively. Processor 24 may be connected to first memory space 21, cache controller 25, flash memory controller 26, data converter 27, and interface 28 by a bus or other means, and the processor is configured to run the non-volatile software programs, instructions, and modules stored in first memory space 21, so as to realize the data recovery method of the present application.

Cache controller 25 is connected to second memory space 22, third memory space 23, processor 24, and flash memory controller 26, respectively, and is configured to control data transmission of second memory space 22 and third memory space 23.

Flash memory controller 26 is connected to flash memory medium 10, data converter 27, and cache controller 25, and is configured to access back-end flash memory medium 10 and manage various parameters and data I/O of flash memory medium 10; or to provide an interface and protocol for access, and implement a corresponding SAS/SATA target protocol end or NVMe protocol end, acquire I/O instructions sent by the Host and decode the same, and generate an internal private data result to wait for execution; or to be responsible for core processing of a Flash Translation Layer (FTL).

Data converter 27 is connected to processor 24 and flash memory controller 26, respectively, and data converter 27 is configured to convert binary data into hexadecimal data and convert hexadecimal data into binary data. In some embodiments, when flash memory controller 26 writes data to flash memory medium 10, data converter 27 converts the binary data to be written into hexadecimal data, and then writes the hexadecimal data to flash memory medium 10. When flash memory controller 26 reads data from flash memory medium 10, data converter 27 converts the hexadecimal data stored in flash memory medium 10 into binary data, and then reads the converted data from a binary data page register. Data converter 27 may include a binary data register and a hexadecimal data register. The binary data register may be configured to store data converted from hexadecimal to binary, and the hexadecimal data register may be configured to store data converted from binary to hexadecimal.

Interface 28 is connected to host 200 and processor 24, and is configured to receive data sent by host 200, or receive data sent by processor 24 to realize data transmission between host 200 and processor 24. Interface 28 may be a SATA-2 interface, a SATA-3 interface, an SAS interface, an MSATA interface, a PCI-E interface, an NGFF interface, a CFast interface, an SFF-8639 interface, and an M.2 NVME/SATA protocol.

It is understandable that the main controller in this embodiment of the present application includes at least one processor, and a memory communicatively connected to the at least one processor, for example: at least one memory in the first memory space, and/or at least one memory in the second memory space, and/or at least one memory in the third memory space. The memory stores instructions executable by the at least one processor, and the instructions are executed by the at least one processor, so that the at least one processor can perform the data recovery method in the embodiment of the present application.

Figure 2:
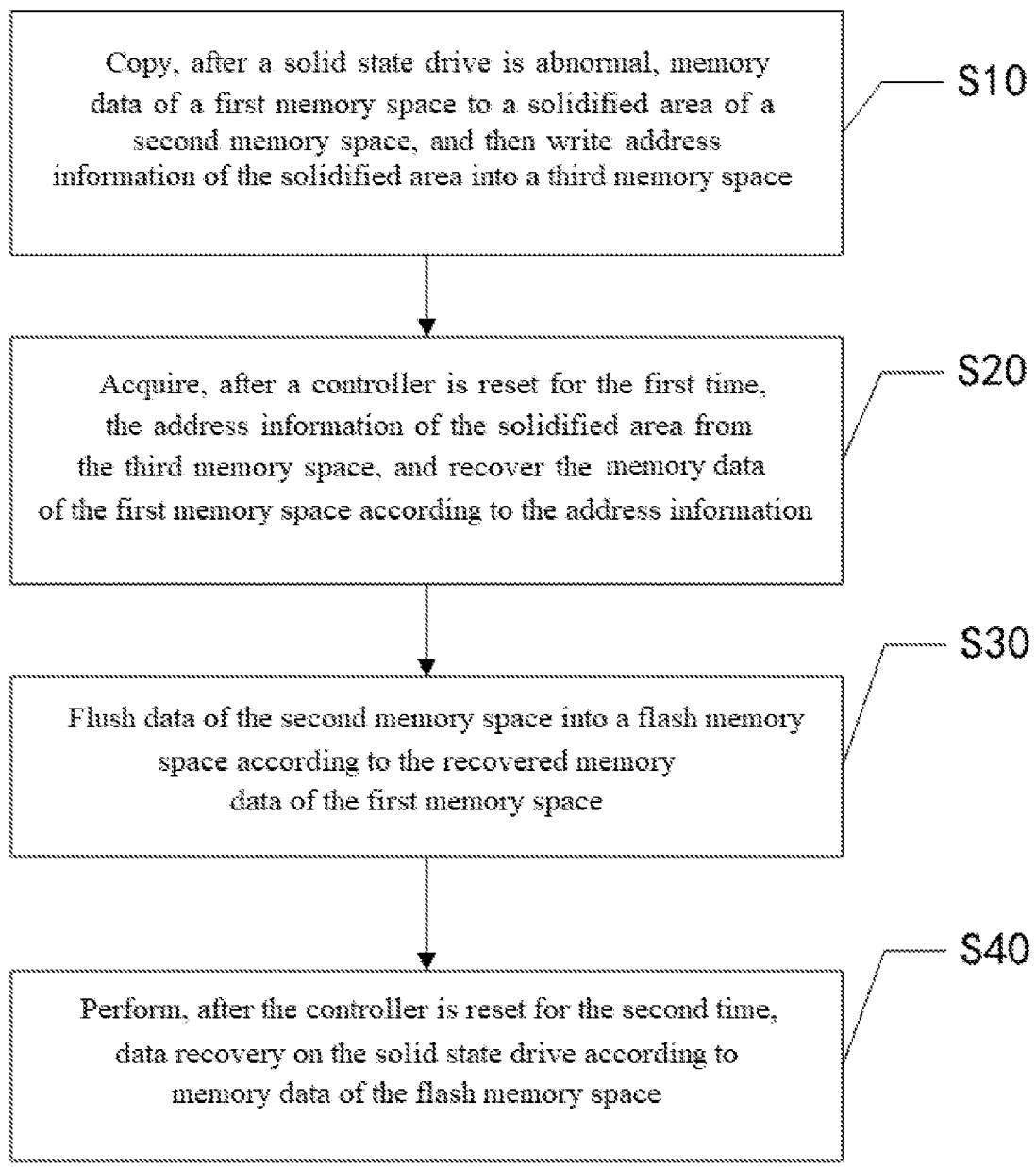
FIG. 2 is a flow chart of a data recovery method according to an embodiment of the present application.

Referring to FIG. 2, a flow chart of a data recovery method according to an embodiment of the present application is shown.

As shown in FIG. 2, the data recovery method includes the following steps.

In step S10, after a solid state drive is abnormal, memory data of a first memory space is copied to a solidified area of a second memory space, and then address information of the solidified area is written into a third memory space.

In some embodiments, the first memory space is a Static Random Access Memory (SRAM) or a Tightly Coupled Memory (TCM). After the controller is reset, the data in the first memory space will be lost.

The second memory space is a Double Data Rate Synchronous Dynamic Random Access Memory (DDR SRAM), referred to as DDR for short, and the data in the second memory space will not be lost after the controller is reset. Therefore, after the solid state drive is failed and abnormal, in order to be able to recover the memory data originally stored in the first memory space after the controller is reset, it is necessary to write the memory data in the first memory space to the second memory space, in some embodiments, write to the solidified area of the second memory space. The solidified area belongs to a part of the second memory space, that is, a DDR area, which is configured to store the memory data in the first memory space.

Figure 3:
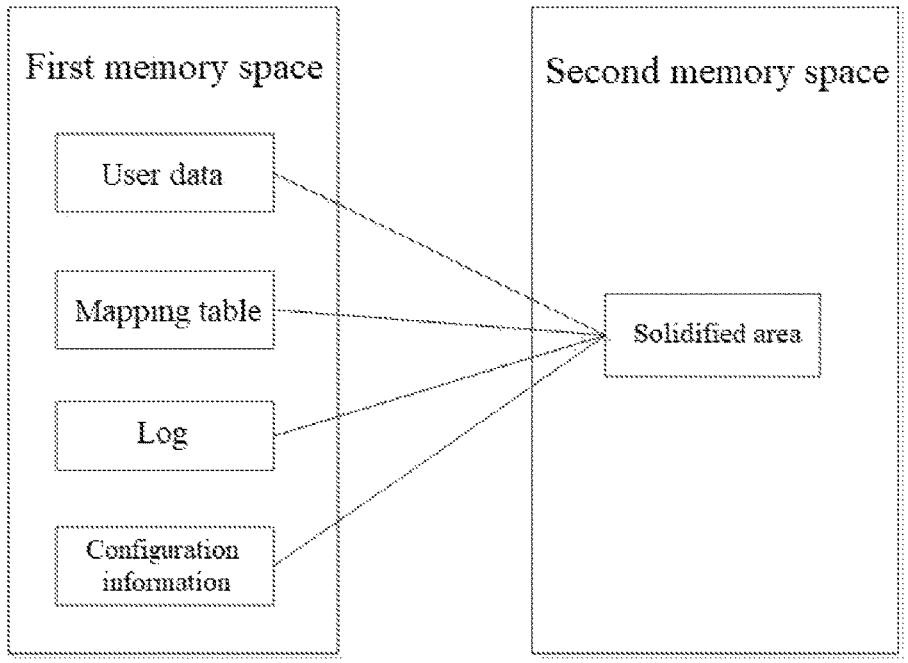
FIG. 3 is a schematic diagram of a relationship between a first memory space and a second memory space according to an embodiment of the present application.

Further referring to FIG. 3, a schematic diagram of a relationship between a first memory space and a second memory space according to an embodiment of the present application is shown.

As shown in FIG. 3, memory data of the first memory space includes user data, a mapping table, a log, and configuration information, wherein the mapping table is used for describing data in the second memory space, for example, metadata of memory data of the second memory space, such as a data type of data stored in a certain section of space in the second memory space and a pointer of the second memory space, and the data in the first memory space can be copied to a solidified area of the second memory space.

In the embodiment of the present application, the read and write speed of the first memory space is higher than that of the second memory space. The first memory space is a section of address space close to the processor, such as close to the CPU, and has a high read and write speed for realizing rapid access to the memory data in the first memory space by the processor. For example, the first memory space is a Static Random Access Memory (SRAM) or a Tightly Coupled Memory (TCM).

Figure 4:
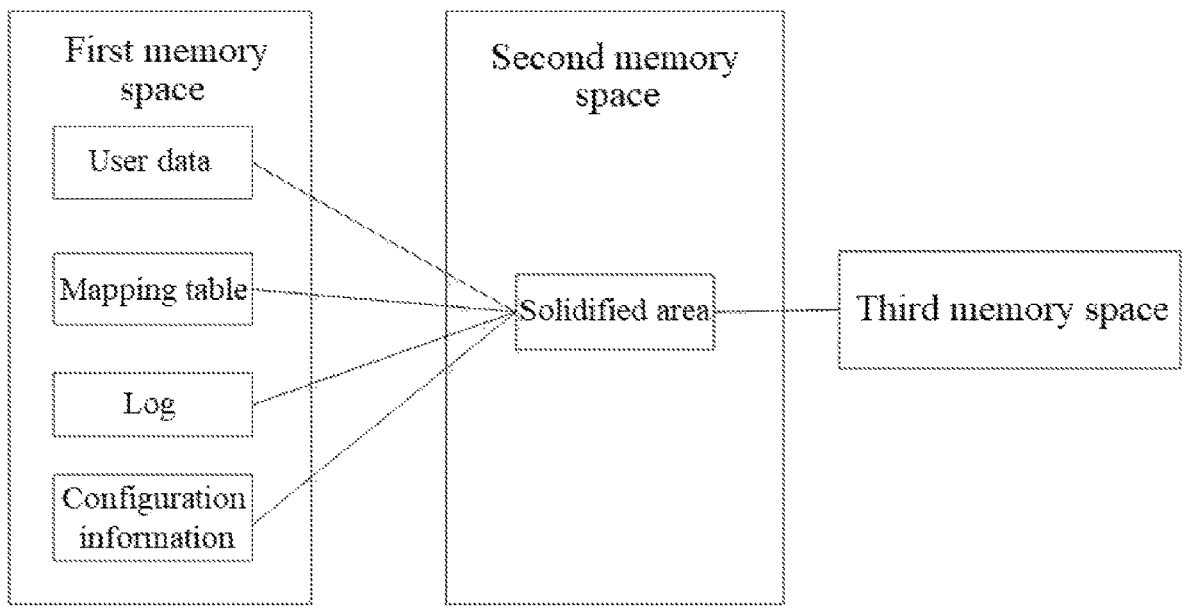
FIG. 4 is a schematic diagram of relationships between a first memory space, a second memory space, and a third memory space according to an embodiment of the present application.

Further referring to FIG. 4, a schematic diagram of relationships between a first memory space, a second memory space, and a third memory space according to an embodiment of the present application is shown.

As shown in FIG. 4, memory data of a solidified area of the second memory space may be written into the third memory space, wherein address information of the solidified area of the second memory space is written into the third memory space, and the address information includes information pairs such as data type, starting address, and length.

In the embodiment of the present application, the read and write speed of the third memory space is higher than that of the second memory space. In some embodiments, the third memory space is a NOR FLASH, and the third memory space can realize synchronous writing operated in bytes. Even if a solid state drive is abnormal, data can still be written.

Figure 5:
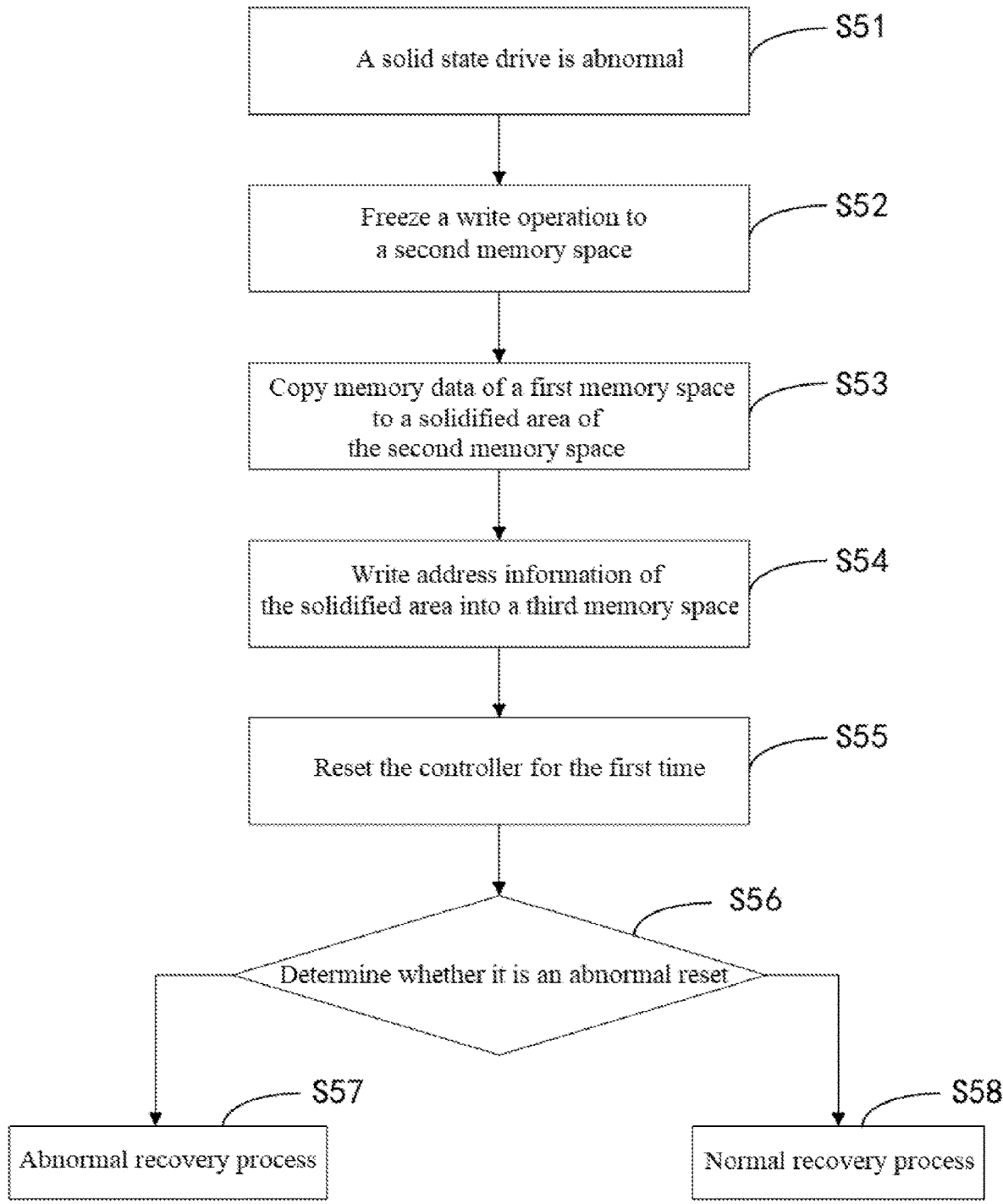
FIG. 5 is a schematic diagram of a reset process according to an embodiment of the present application.

Further referring to FIG. 5, a schematic diagram of a reset process according to an embodiment of the present application is shown.

As shown in FIG. 5, the reset process includes the following steps.

In step S51, a solid state drive is abnormal.

In some embodiments, the abnormality of the solid state drive includes problems such as sudden power failure and abnormal data loss. The sudden power failure means that after a 12V power supply is suddenly lost, a power failure interruption is triggered, and then a capacitor is used to supply power. During the time of power supply by the capacitor, a power-off process is performed, and in this process, user data and metadata in the cache may be flushed down to a flash NAND.

In step S52, a write operation to a second memory space is frozen.

In some embodiments, the second memory space includes a preset memory space, and the preset memory space is used for writing user data, and the freezing a write operation to the second memory space includes: freezing the preset memory space so that user data is no longer written into the preset memory space.

In step S53, memory data of a first memory space is copied to a solidified area of the second memory space.

In some embodiments, the first memory space is an SRAM memory or a TCM memory, and the solidified area is set to be specially used to store the memory data in the first memory space. It is understandable that the memory size of the solidified area is greater than the size of the first memory space, for ensuring that the memory data of the first memory space can be stored into the second memory space, where the second memory space is used for storing user data and metadata.

In step S54, address information of the solidified area is written into a third memory space.

In some embodiments, the third memory space is a NOR FLASH, and the writing address information of the solidified area into the third memory space includes writing information pairs such as type, starting address, and length of the solidified area into the third memory space.

In the embodiment of the present application, the solid state drive further includes a register space, and after the address information of the solidified area is written into the third memory space, the method further includes:
generating abnormal reset flag information, and writing the abnormal reset flag information into the register space.

In some embodiments, after a hot restart, data in the register space is not lost. The register space includes an Always On (AON) register, and after determining that the address information of the solidified area is written into the third memory space, the processor of the solid state drive will generate the abnormal reset flag information, and write the abnormal reset flag information into the AON register. The characteristic of the AON register is that its data is not lost after a hot restart, where the abnormal reset flag information is used for flagging the reset of the controller as an abnormal reset. For example, the AON register is an 8-bit register, and a number of 0-0xFF can be written. For example, it is agreed to write a value of 0xCE as a flag to determine whether it is an abnormal reset. The value of the AON register is read during power-on. If the value of the AON register is 0xCE, it is determined to be an abnormal reset. If it is not 0xCE, it is determined to be a normal reset.

In step S55, the controller is reset for the first time.

In step S56, it is determined whether it is an abnormal reset.

The processor determines whether the reset of the controller is an abnormal reset according to a state of the register space. In some embodiments, the processor determines whether the reset of the controller is abnormal according to whether abnormal reset flag information exists in the AON register, determines that the reset of the controller is an abnormal reset if it exists, and determines that the controller reset is a normal reset if it does not exist.

If it is an abnormal reset, the process proceeds to step S57, an abnormal recovery process; and if it is not an abnormal reset, the process proceeds to step S58, a normal recovery process.

Step S57: an abnormal recovery process.

In some embodiments, the abnormal recovery process refers to a recovery process performed by the processor after recognizing that abnormal reset flag information exists in the register space. For details, reference may be made to the description below.

Step S58, a normal recovery process.

In some embodiments, the normal recovery process is different from the abnormal recovery process. The normal recovery process, that is, a normal power-on process, does not require re-moving and writing user data or performing consistency verification. The normal recovery process includes reading a mapping table and related configuration information from the NAND FLASH. It is determined by the state of the AON register whether the recovery process is an abnormal process or a normal process, and the present application can improve the speed of data recovery.

In step S20, after the controller is reset for the first time, the address information of the solidified area is acquired from the third memory space, and the memory data of the first memory space is recovered according to the address information.

In some embodiments, the purpose of resetting the controller for the first time is to recover the controller to a normal state. After the controller is reset for the first time, the method further includes: determining whether the controller is reset abnormally according to the abnormal reset flag information in the register space, and if yes, entering the abnormal recovery process, wherein the third memory space stores the address information of the solidified area, for example, information pairs such as data type, starting address, and length. By acquiring the address information of the solidified area, memory data corresponding to the address information is acquired, where the memory data corresponding to the address information is the memory data in the first memory space, and the memory data in the first memory space can be found according to the address information, so as to recover the memory data in the first memory space.

In step S30, data of the second memory space is flushed into a flash memory space according to the recovered memory data of the first memory space.

In some embodiments, the first memory space is an SRAM memory or a TCM memory, the memory data in the first memory space is SRAM data or TCM data, and the SRAM data or TCM data stores a pointer to user data in the second memory space.

Figure 6:
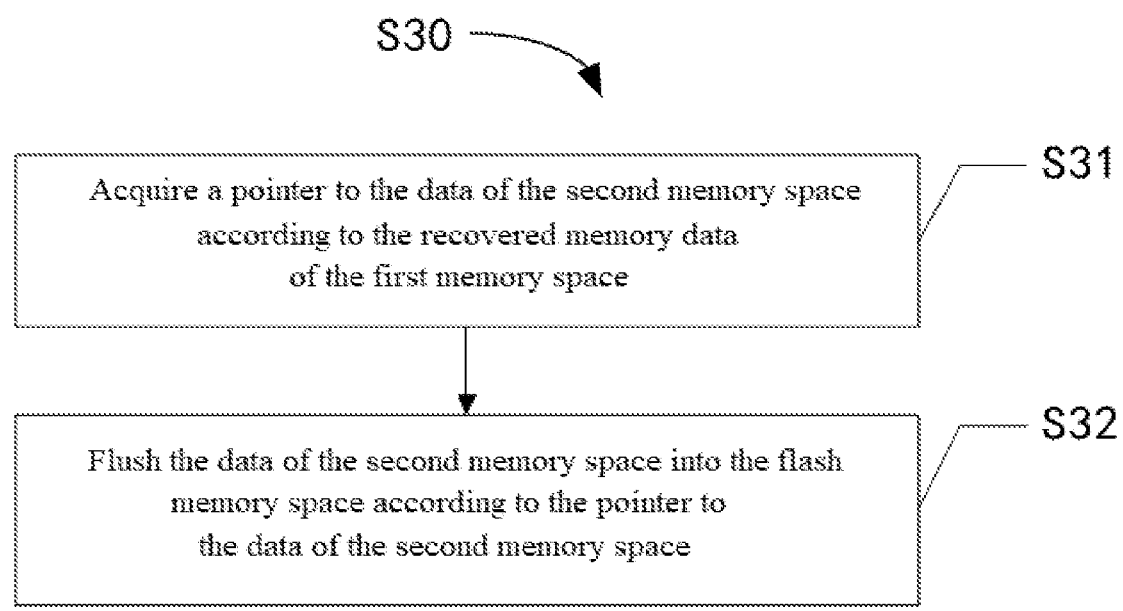
FIG. 6 is a detailed flow chart of step S30 in FIG. 2.

Further referring to FIG. 6, FIG. 6 is a detailed flow chart of step S30 in FIG. 2.

As shown in FIG. 6, step S30 of flushing data of the second memory space into a flash memory space according to the recovered memory data of the first memory space includes the following steps.

In step S31, a pointer to the data of the second memory space is acquired according to the recovered memory data of the first memory space.

In some embodiments, after the memory data of the first memory space is read according to the address information of the solidified area, a pointer to the data of the second memory space is acquired according to the memory data of the first memory space. For example, a DDR address of the solidified area is read from a NOR FLASH, and then SRAM data before reset is recovered from the DDR address. Based on the recovered SRAM data, pointers to user data of various parts of the DDR are obtained.

In some embodiments, the acquiring a pointer to the data of the second memory space according to the recovered memory data of the first memory space includes: acquiring a pointer to user data of the second memory space and a pointer to metadata of the second memory space. The pointer to the user data is DDR information of the user data, and the pointer to the metadata is DDR information of the metadata. Both the DDR information of the user data and the DDR information of the metadata are pointers to the second memory space, that is, the DDR space. However, the data types of the two in the second memory space are different, and their functions are also different. The DDR information of the user data is mainly used for protecting user data that still exists in the cache of the second memory space, i.e., a DDR cache, when an abnormality occurs, while the DDR information of the metadata refers to data required for firmware running, instead of data written by the user.

In step S32, the data of the second memory space is flushed into the flash memory space according to the pointer to the data of the second memory space.

In some embodiments, the pointer to the data of the second memory space is a DDR pointer to user data. The user data is flushed into the flash memory space according to the DDR pointer to user data, and the flash memory space is a NAND FLASH.

In some embodiments, the flushing the data of the second memory space into the flash memory space according to the pointer to the data of the second memory space includes: flushing the metadata into a second preset area of the flash memory space after the user data is flushed into a first preset area of the flash memory space, where the second preset area is set for storing metadata. The second preset area is set to be specially used for storing metadata, and it is a NAND area in which the user writes metadata.

In the embodiment of the present application, the method further includes:

determining pairing mapping information between logical addresses of the user data and physical addresses written into the first preset area; and writing the pairing mapping information between logical addresses of the user data and physical addresses written into the first preset area into the second preset area.

In step S40, after the controller is reset for the second time, data recovery is performed on the solid state drive according to memory data of the flash memory space.

Figure 7:
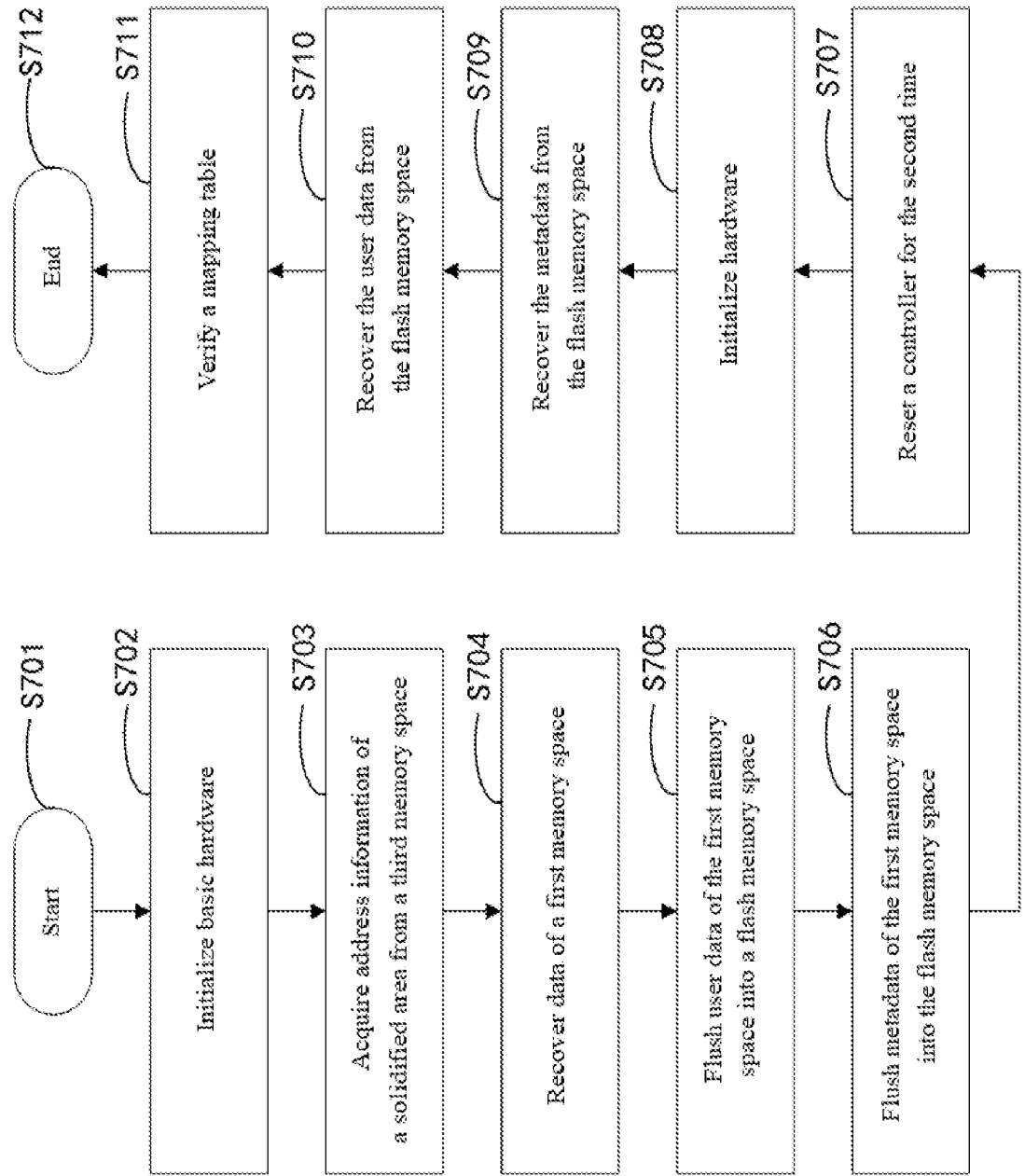
FIG. 7 is a schematic diagram of an abnormal recovery process according to an embodiment of the present application.

Further referring to FIG. 7, a schematic diagram of an abnormal recovery process according to an embodiment of the present application is shown.

As shown in FIG. 7, the abnormal recovery process includes the following steps.

In step S701, the process starts.

In some embodiments, data recovery is started.

In step S702, basic hardware is initialized.

In some embodiments, necessary hardware including hardware such as a flash memory controller, a processor, and a cache controller is initialized.

In step S703, address information of a solidified area is acquired from a third memory space.

In some embodiments, the third memory space is a NOR FLASH, the address information of the solidified area is acquired from the NOR FLASH, and the address information is a DDR address, that is, the DDR address of the solidified area is acquired from the NOR FLASH.

In step S704, data of a first memory space is recovered.

In some embodiments, the DDR address of the solidified area is read from the NOR FLASH, and according to the DDR address, the data of the first memory space before reset is recovered, the data of the first memory space including: TCM data and/or SRAM data, and a pointer to user data of a second memory space, namely, a DDR pointer, being obtained according to the TCM data and/or SRAM data.

In step S705, user data of the first memory space is flushed into a flash memory space.

In some embodiments, the flash memory space is divided into a common flash memory space area and a system area, where the common flash memory space area is used for storing user data, and the system area is used for storing system data required for firmware running. The user data of the first memory space is flushed into the memory space, that is, the protected user data is flushed into a first preset area of the flash memory space, the first preset area is the system area, and pairing mapping information between logical addresses of the user data and physical addresses written into the first preset area of the flash memory space is written into the flash memory space.

It is understandable that the size of the common flash memory space area is greater than the size of the system area. For example, the common flash memory space area accounts for 90% of the flash memory space, and the system area accounts for 10% of the flash memory space.

It is understandable that after the user data is written into the flash memory space, a mapping table needs to be updated, that is, a corresponding relationship between the logical address and the physical address of the user data needs to be updated. Therefore, the logical address and the physical address of the user data need to be paired to generate pairing mapping information, and the pairing mapping information is written into the flash memory space for subsequent recovery procedures.

In step S706, metadata of the first memory space is flushed into the flash memory space.

In some embodiments, the metadata includes a mapping table, a log, configuration information, and the like, and the metadata is flushed into a second preset area of the flash memory space according to a DDR pointer to the metadata such as the mapping table, log, and configuration information. The second preset area is set for storing metadata, that is, the second preset area is originally used for storing metadata. After the metadata in the first memory space is flushed into the flash memory space, abnormal reset flag information is generated, and the abnormal reset flag information is written into a register space.

In the embodiment of the present application, the user data is flushed into the flash memory space, and then the metadata is flushed into the flash memory space, which can prevent errors in the mapping table and ensure normal operation of recovery.

In step S707, the controller is reset for the second time.

In some embodiments, through a power-on recovery process, the controller is reset again.

In step S708, the hardware is initialized.

In some embodiments, the hardware configuration is initialized. For example, hardware such as a flash memory controller, a processor, a cache controller, and a data converter is initialized.

In step S709, the metadata is recovered from the flash memory space.

In some embodiments, the mapping table and other metadata are recovered from the flash memory space NAND FLASH. In some embodiments, the configuration information, mapping table, and log information are sequentially loaded from the flash memory space, and the latest user mapping table is calculated according to the configuration information, mapping table, and log information.

In step S710, the user data is recovered from the flash memory space.

In some embodiments, the protected user data is read from the NAND FLASH and written into the common flash memory space area, that is, a common user NAND area. In some embodiments, writing the protected user data into the common user NAND area includes: loading the pairing mapping information between the logical address and the physical address of the user data from the flash memory space, reading the user data from the flash memory space according to the physical address in the pairing mapping information, and writing the same into the common user NAND area while updating the user mapping table according to the logical address in the pairing mapping information.

The flash memory space is divided into a common flash memory space area and a system area, the common flash memory space area is used for storing user data, and the system area is used for storing system data required for firmware running.

In the embodiment of the present application, the performing, after the controller is reset for the second time, data recovery on the solid state drive according to memory data of the flash memory space includes:
acquiring user data from the flash memory space according to the pairing mapping information; and
recovering the acquired user data to a user area in the flash memory space, and updating the mapping table based on the pairing mapping information.

The user area in the flash memory space refers to the flash memory area used for storing user data, that is, the common flash memory space area. After the acquired user data is recovered to the user area in the flash memory space, it is necessary to update the mapping table based on the pairing mapping information.

In step S711, the mapping table is verified.

When the main controller encounters an abnormality, its data consistency may already have problems, so after the recovery process, it is necessary to re-verify the consistency, that is, perform metadata verification to determine data consistency, that is, check the consistency of information of the mapping table.

The mapping table is a mapping relationship from logical addresses to physical addresses. The data written in the flash memory space, in addition to the data itself, also has logical address information at which the data is input, and a serial number indicating an order in which the data is written. By reading the memory data in the flash memory space, the logical address, the physical address, and the old and new relationship of the memory data can be determined. The mapping table is looked up according to the logical address to determine whether the physical address corresponding to the mapping table and the read physical address are consistent. If they are consistent, the verification is passed. If they are inconsistent, the verification is not passed. At this time, it is necessary to find out the erroneous data and flag it.

In some embodiments, the performing metadata verification to determine data consistency includes:
determining a superblock to which data is last written, where the superblock is the granularity of the allocated space for the user to write data, when writing data, a superblock needs to be allocated, and after one superblock is fully written, a next superblock is allocated, so as to write data into the next superblock;
according to a logical address of the data in the superblock, looking up the mapping table for a physical address corresponding to the logical address, and comparing to see whether the physical address of the data is consistent with the corresponding physical address in the mapping table;

if yes, determining that the data consistency is reliable; and if no, determining that the data consistency is unreliable, where at this time, the data needs to be flagged as erroneous, so that the host returns an error flag when reading the data.

It is understandable that when there are a plurality of pieces of data among the data read in the scope of verification correspond to one logical address, the serial number is used to determine whether the data is old or new. A larger serial number indicates newer data. Since only the data written in the last period of time needs to be verified, that is, the scope of verification is in the last written superblock, the amount of data to be verified is not large, and the time required is not long, and therefore, the verification of the mapping table will not affect the time of data recovery and can also guarantee the correctness of the data recovery.

In step S712, the process ends.

In some embodiments, the data recovery process is ended.

It is understandable that after the data recovery process, the solid state drive can establish normal data communication with the host. However, if the data consistency of a plurality of pieces of data is determined to be unreliable in the superblock, a large amount of data may be lost at this time, and it is necessary to return alarm information to the host.

In the embodiments of the present application, a data recovery method is provided, which is applied to a solid state drive, where the solid state drive includes a first memory space, a second memory space, a third memory space, and a flash memory space, and the method includes: copying, after an abnormality occurs in the solid state drive, memory data of the first memory space to a solidified area of the second memory space, and then writing address information of the solidified area to the third memory space; acquiring, after a controller is reset for the first time, the address information of the solidified area from the third memory space, and recovering, the memory data of the first memory space according to the address information; flushing data of the second memory space into the flash memory space according to the recovered memory data of the first memory space; and performing, after the controller is reset for the second time, data recovery on the solid state drive according to memory data of the flash memory space. By writing the data of the first memory space into the solidified area, recovering the data of the first memory space according to the address information of the solid state area, then writing it into the flash memory space, and finally performing data recovery from the flash memory space, the present application can improve the data recovery speed of the solid state drive.

Figure 8:
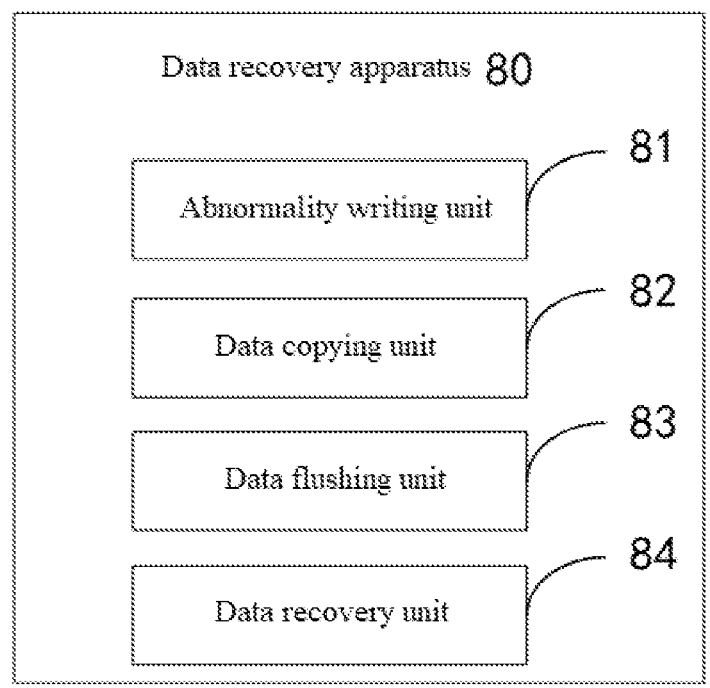
FIG. 8 is a schematic structural diagram of a data recovery apparatus according to an embodiment of the present application.

Referring to FIG. 8, a schematic structural diagram of a data recovery apparatus according to an embodiment of the present application is shown.

Data recovery apparatus 80 is applied to a solid state drive, and the solid state drive includes a first memory space, a second memory space, a third memory space, and a flash memory space, and the apparatus includes:
abnormality writing unit 81 configured to copy, after an abnormality occurs in the solid state drive, memory data of the first memory space to a solidified area of the second memory space, and then write address information of the solidified area into the third memory space;
data copying unit 82 configured to acquire, after a controller is reset for the first time, the address information of the solidified area from the third memory space, and recover the memory data of the first memory space according to the address information;
data flushing unit 83 configured to flush data of the second memory space into the flash memory space according to the recovered memory data of the first memory space; and
data recovery unit 84 configured to perform, after the controller is reset for the second time, data recovery on the solid state drive according to memory data of the flash memory space.

In the embodiment of the present application, the solid state drive further includes: a register space, data in the register space will not be cleared after the controller is reset, and after the writing address information of the solidified area into the third memory space, the apparatus further includes:
a register reset flag unit configured to generate abnormal reset flag information, and write the abnormal reset flag information into the register space.

In the embodiment of the present application, the data flushing unit includes:
a pointer module configured to acquire a pointer to the data of the second memory space according to the recovered memory data of the first memory space; and
a flushing module configured to flush the data of the second memory space into the flash memory space according to the pointer to the data of the second memory space.

In the embodiment of the present application, the pointer module is configured to:
acquire a pointer to user data of the second memory space and a pointer to metadata of the second memory space.

In the embodiment of the present application, the flushing module is configured to:
flush the metadata into a second preset area of the flash memory space after the user data is flushed into a first preset area of the flash memory space, wherein the second preset area is set for storing metadata.

In the embodiment of the present application, the flushing module is further configured to:
determine pairing mapping information between logical addresses of the user data and physical addresses written into the first preset area; and
write the pairing mapping information between logical addresses of the user data and physical addresses written into the first preset area into the second preset area.

In the embodiment of the present application, the data recovery unit is configured to:
acquire user data from the flash memory space according to the pairing mapping information; and
recover the acquired user data to a user area in the flash memory space, and update a mapping table based on the pairing mapping information.

In the embodiment of the present application, the apparatus further includes:
a data consistency unit configured to perform metadata verification to determine data consistency.

Since the apparatus embodiment and the method embodiment are based on the same concept, the content of the apparatus embodiment may refer to the method embodiment on the premise that the contents do not conflict with each other, so it is not repeated here.

In the embodiment of the present application, a data recovery apparatus is provided, which is applied to a solid state drive. The solid state drive includes a first memory space, a second memory space, a third memory space, and a flash memory space, and the apparatus includes: an abnormality writing unit configured to copy, after an abnormality occurs in the solid state drive, memory data of the first memory space to a solidified area of the second memory space, and then write address information of the solidified area into the third memory space; a data copying unit configured to acquire, after a controller is reset for the first time, the address information of the solidified area from the third memory space, and recover the memory data of the first memory space according to the address information; a data flushing unit configured to flush data of the second memory space into the flash memory space according to the recovered memory data of the first memory space; and a data recovery unit configured to perform, after the controller is reset for the second time, data recovery on the solid state drive according to memory data of the flash memory space. By writing the data of the first memory space into the solidified area, recovering the data of the first memory space according to the address information of the solid state area, then writing it into the flash memory space, and finally performing data recovery from the flash memory space, the present application can improve the data recovery speed of the solid state drive.

Embodiments of the present application further provide a non-volatile computer storage medium, where the computer storage medium stores computer-executable instructions, and the computer-executable instructions are executed by one or more processors, for example, one processor 24 in FIG. 1, to cause the above one or more processors to perform the data recovery method in any of the above method embodiments, for example, to perform the data recovery method in any of the above method embodiments, for example, to perform various steps shown in FIG. 2 as described above; or to implement the functions of various units described in FIG. 8.

The invention claimed is:

1. A data recovery method applied to a solid state drive, wherein the solid state drive comprises a first memory space, a second memory space, a third memory space, and a flash memory space, and the method comprises:
   copying, after an abnormality occurs in the solid state drive, memory data of the first memory space to a solidified area of the second memory space, and then writing address information of the solidified area into the third memory space;
   acquiring, after a controller is reset for the first time, the address information of the solidified area from the third memory space, and recovering the memory data of the first memory space according to the address information;
   flushing data of the second memory space into the flash memory space according to the recovered memory data of the first memory space; and
   performing, after the controller is reset for the second time, data recovery on the solid state drive according to memory data of the flash memory space.

2. The method according to claim 1, wherein the solid state drive further comprises a register space, and data in the register space is not to be cleared after the controller is reset, after writing the address information of the solidified area into the third memory space, the method further comprises:
   generating abnormal reset flag information, and writing the abnormal reset flag information into the register space.

3. The method according to claim 1, wherein flushing the data of the second memory space into the flash memory space according to the recovered memory data of the first memory space comprises:
   acquiring a pointer to the data of the second memory space according to the recovered memory data of the first memory space; and
   flushing the data of the second memory space into the flash memory space according to the pointer to the data of the second memory space.

4. The method according to claim 3, wherein acquiring the pointer to the data of the second memory space according to the recovered memory data of the first memory space comprises:
   acquiring a pointer to user data of the second memory space and a pointer to metadata of the second memory space.

5. The method according to claim 4, wherein flushing the data of the second memory space into the flash memory space according to the pointer to the data of the second memory space comprises:
   flushing the metadata into a second preset area of the flash memory space after the user data is flushed into a first preset area of the flash memory space, wherein the second preset area is set for storing metadata.

6. The method according to claim 5, further comprising:
   determining pairing mapping information between logical addresses of the user data and physical addresses written into the first preset area; and
   writing the pairing mapping information between logical addresses of the user data and physical addresses written into the first preset area into the second preset area.

7. The method according to claim 6, wherein the performing, after the controller is reset for the second time, data recovery on the solid state drive according to memory data of the flash memory space comprises:
   acquiring user data from the flash memory space according to the pairing mapping information;
   recovering the acquired user data to a user area in the flash memory space; and
   updating a mapping table based on the pairing mapping information.

8. The method according to claim 1, wherein after the data recovery is performed on the solid state drive, the method further comprises:
   performing metadata verification to determine data consistency.

9. The method according to claim 1, wherein before copying, after the abnormality occurs in the solid state drive, the memory data of the first memory space to the solidified area of the second memory space, the method comprises:
   freezing a write operation to the second memory space.

10. The method according to claim 1, wherein after the controller is reset for the first time, the method further comprises:
    determining whether the reset of the controller is an abnormal reset according to a state of a register space.

11. A solid state drive, comprising:
    a first memory space;
    a second memory space;
    a third memory space;
    a flash memory space;
    a flash memory medium; and
    a main controller connected to the flash memory medium, wherein the main controller comprising:
    a memory storing instructions; and
    at least one processor coupled to the memory and configured to execute the instructions to perform operations comprising:
    copying, after an abnormality occurs in the solid state drive, memory data of the first memory space to a solidified area of the second memory space, and then writing address information of the solidified area into the third memory space;

acquiring, after a controller is reset for the first time, the address information of the solidified area from the third memory space, and recovering the memory data of the first memory space according to the address information;

flushing data of the second memory space into the flash memory space according to the recovered memory data of the first memory space; and performing, after the controller is reset for the second time, data recovery on the solid state drive according to memory data of the flash memory space.

12. The solid state drive according to claim 11, further comprising a register space, data in the register space is not to be cleared after the controller is reset, after writing the address information of the solidified area into the third memory space, the operations further comprise:

generating abnormal reset flag information, and writing the abnormal reset flag information into the register space.

13. The solid state drive according to claim 11, wherein flushing the data of the second memory space into the flash memory space according to the recovered memory data of the first memory space comprises:

acquiring a pointer to the data of the second memory space according to the recovered memory data of the first memory space; and flushing the data of the second memory space into the flash memory space according to the pointer to the data of the second memory space.

14. The solid state drive according to claim 13, wherein acquiring the pointer to the data of the second memory space according to the recovered memory data of the first memory space comprises:

acquiring a pointer to user data of the second memory space and a pointer to metadata of the second memory space.

15. The solid state drive according to claim 14, wherein flushing the data of the second memory space into the flash memory space according to the pointer to the data of the second memory space comprises:

flushing the metadata into a second preset area of the flash memory space after the user data is flushed into a first preset area of the flash memory space, wherein the second preset area is set for storing metadata.

16. The solid state drive according to claim 15, the operations further comprise:

determining pairing mapping information between logical addresses of the user data and physical addresses written into the first preset area; and writing the pairing mapping information between logical addresses of the user data and physical addresses written into the first preset area into the second preset area.

17. The solid state drive according to claim 16, wherein the performing, after the controller is reset for the second time, data recovery on the solid state drive according to memory data of the flash memory space comprises:

acquiring user data from the flash memory space according to the pairing mapping information;

recovering the acquired user data to a user area in the flash memory space; and updating a mapping table based on the pairing mapping information.

18. The solid state drive according to claim 11, wherein after the data recovery is performed on the solid state drive, the operations further comprise:

performing metadata verification to determine data consistency.

19. A non-transitory computer-readable medium, storing a computer program, when the computer program is executed by a processor of a solid state drive, wherein the solid state drive comprises a first memory space, a second memory space, a third memory space, and a flash memory space, causes the processor to perform operations comprising:

copying, after an abnormality occurs in the solid state drive, memory data of the first memory space to a solidified area of the second memory space, and then writing address information of the solidified area into the third memory space;

acquiring, after a controller is reset for the first time, the address information of the solidified area from the third memory space, and recovering the memory data of the first memory space according to the address information;

flushing data of the second memory space into the flash memory space according to the recovered memory data of the first memory space; and performing, after the controller is reset for the second time, data recovery on the solid state drive according to memory data of the flash memory space.

20. The non-transitory computer-readable medium according to claim 19, wherein the solid state drive further comprises a register space, and data in the register space is not to be cleared after the controller is reset, after writing the address information of the solidified area into the third memory space, the operations further comprise:

generating abnormal reset flag information, and writing the abnormal reset flag information into the register space.

* * * * *